(12) United States Patent
Mattam et al.

(10) Patent No.: US 12,477,574 B2
(45) Date of Patent: Nov. 18, 2025

(54) SYSTEM AND METHOD FOR CONDITIONAL HANDOVER BY A USER EQUIPMENT IN A 5G COMMUNICATION NETWORK

(71) Applicant: SAMSUNG ELECTRONICS CO., LTD., Suwon-si (KR)

(72) Inventors: Jajohn Mathew Mattam, Bangalore (IN); Fasil Abdul Latheef, Bangalore (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 565 days.

(21) Appl. No.: 17/890,012

(22) Filed: Aug. 17, 2022

(65) Prior Publication Data

US 2023/0059448 A1     Feb. 23, 2023

Related U.S. Application Data

(63) Continuation of application No. PCT/KR2022/012204, filed on Aug. 16, 2022.

(30) Foreign Application Priority Data

Aug. 17, 2021  (IN) .............................. 202141037328
Mar. 28, 2022  (IN) .............................. 202141037328

(51) Int. Cl.
*H04W 74/04*     (2009.01)
*H04W 36/00*     (2009.01)
(Continued)

(52) U.S. Cl.
CPC ....... *H04W 74/04* (2013.01); *H04W 36/0058* (2018.08); *H04W 36/00835* (2018.08);
(Continued)

(58) Field of Classification Search
CPC ............. H04W 74/04; H04W 36/0058; H04W 36/00835; H04W 74/0841; H04W 36/362
See application file for complete search history.

(56) References Cited

U.S. PATENT DOCUMENTS

2005/0208942 A1   9/2005   Pekonen et al.
2016/0309376 A1   10/2016  Liu et al.
(Continued)

FOREIGN PATENT DOCUMENTS

KR   10-2016-0120250   10/2016
KR   10-2017-0084625   7/2017
(Continued)

OTHER PUBLICATIONS

Extended European Search Report dated Oct. 21, 2024 issued in European Patent Application No. 22858715.0.
(Continued)

*Primary Examiner* — Jackie Zuniga Abad
(74) *Attorney, Agent, or Firm* — NIXON & VANDERHYE P.C.

(57) ABSTRACT

The present disclosure provides a method for conditional handover by a user equipment (UE) in a 5G communication network. The method may include: receiving, by the UE, a conditional handover command, and an associated condition from the source cell; receiving, by the UE, a plurality of target cell configurations, from the source cell, having details for a plurality of target cells meeting a conditional handover criterion; evaluating, by the UE, the received associated condition for the conditional handover; and assigning priority to the received target cells configured in the conditional handover during the cell selection procedure. The method may include selecting one target cell for conditional handover from among the plurality of target cells based on the assigned priority.

16 Claims, 10 Drawing Sheets

(51) Int. Cl.
*H04W 74/0833* (2024.01)
*H04W 36/36* (2009.01)
*H04W 74/0838* (2024.01)

(52) U.S. Cl.
CPC ...... *H04W 74/0841* (2013.01); *H04W 36/362* (2023.05); *H04W 74/0833* (2013.01); *H04W 74/0838* (2024.01)

(56) References Cited

U.S. PATENT DOCUMENTS

| | | | |
|---|---|---|---|
| 2017/0215117 | A1 | 7/2017 | Kwon et al. |
| 2019/0223073 | A1* | 7/2019 | Chen ................ H04W 36/0077 |
| 2020/0413308 | A1 | 12/2020 | Hwang et al. |
| 2021/0068016 | A1 | 3/2021 | Shi et al. |
| 2021/0168678 | A1* | 6/2021 | Deenoo ................ H04W 24/08 |

FOREIGN PATENT DOCUMENTS

| | | |
|---|---|---|
| WO | 2019/137453 | 7/2019 |
| WO | 2019/195060 | 10/2019 |
| WO | 2020/117114 | 6/2020 |
| WO | 2021/070162 | 4/2021 |
| WO | 2021/091342 | 5/2021 |

OTHER PUBLICATIONS

Extended European Search Report dated Jul. 31, 2024 issued in European Patent Application No. 22858715.0.
3GPP TSG-RAN WG2, "Consideration of Beamforming for NR Conditional Hamdover", Meeting Notes, Meeting #106, May 13, 2019, 3 pages.
Search Report and Written Opinion dated Nov. 25, 2022 issued in International Patent Application No. PCT/KR2022/012204.
"Conditional HO for RLF recovery", 3GPP TSG-RAN WG2 Meeting #114 electronic R2-2105396 Online, May 19-27, 2021, 5 pages.
"SON Enhancements for CHO", 3GPP TSG-RAN WG2 Meeting #114-e Online, May 19-27, 2021, 8 pages.
"Remaining handover SON aspects, also covering multiple events", 3GPP TSG-RAN WG2#114 Meeting Electronic, May 19-27, 2021, 15 pages.
Indian Office Action issued Mar. 28, 2023 in corresponding Indian Patent Application No. 202141037328.

* cited by examiner

SYSTEM AND METHOD FOR CONDITIONAL HANDOVER BY A USER EQUIPMENT IN A 5G COMMUNICATION NETWORK

CROSS-REFERENCE TO RELATED APPLICATIONS

This application is a continuation of International Application No. PCT/KR2022/012204, filed on Aug. 16, 2022, in the Korean Intellectual Property Receiving Office and claiming priority to Indian Provisional patent application number 202141037328, filed on Aug. 17, 2021, in the Indian Patent Office, and to Indian Complete patent application number 202141037328, filed on Mar. 28, 2022, in the Indian Patent Office, the disclosures of each of which are incorporated by reference herein in their entireties.

BACKGROUND

Field

The disclosure relates to the system and method for conditional handover by user equipment in a 5G communication network.

Description of Related Art

3GPP has introduced a feature called conditional handover for mobility enhancements in release 16. Release 16 focuses on the solution(s) to improve HO/SCG change reliability and robustness, especially considering challenges in high/med frequency focusing on the following identified solutions but not limited to Conditional handover and Fast handover failure recovery.

To improve the HO/SCG change reliability and robustness, conditional handover (CHO and CPC) has been introduced. This feature mainly helps in avoiding the normal handover failures due to the failure in the device successfully receiving the HO command from a network (NW) after sending the measurement report. When the network configures the conditional handover, it will share the condition to trigger the handover and the configuration that needs to be applied to the target cell if the condition for handover is met. In a typical handover scenario, user equipment (UE) transmits measurement reports if the link to the serving cell is getting degraded and/or another neighboring cell is getting better than the serving cell. The NW may hand over the UE from the serving cell to that neighbor cell. FIG. 1A is a signal flow diagram illustrating, when the radio link becomes degraded and the UE 102a needs to send measurement reports e.g., the uplink link is degraded, and the reports never reach the source node (or network) 102b. FIG. 1B is a signal flow diagram depicting illustrating the source node (or network) 102b tries to respond with a handover command that may never reach the mobile terminal 102a e.g., the downlink is degraded.

FIG. 2 is a signal flow diagram illustrating a method for conditional handover, according to an existing technique. The method may include receiving by the UE 202, handover command from the source node (or network) 204, and storing it without applying it. Along with the command, the method may include receiving, by the UE 202, an associated condition to be monitored. When the condition is fulfilled, the UE 202 may be configured to apply the previously-stored handover command. The method may include transmitting by the UE 202 handover confirmation to the potential target node 206.

As per 3GPP 38.331, in conditional configuration execution, there is no defined mechanism to prioritize if multiple cells meet the conditional handover criteria and are up to the UE implementation. If there is no proper mechanism defined to select the target cell, it may result in the device not selecting the best cell.

As per the 3GPP specification, if a cell selected for re-establishment is part of the conditional handover configuration (varcondconfig), the UE may perform conditional handover instead of re-establishment. But there is no defined mechanism for selecting the cell in this case.

The CHO or CPC is executed only when the execution condition is satisfied. When T310 is running and the execution condition is not satisfied, then UE will eventually declare radio link failure (RLF) and trigger RRE.

As per the 3GPP specification, a conditional handover procedure after RLF or HOF/CHOF relies on the legacy T304. After T304 timer expiry (which results in RLF), the device has to trigger Re-establishment as defined in the spec. For example, the measurements of the cells (or beams) might have changed between the meeting of CHO criteria and the RACH attempt on the CHO candidate. The current version of spec does not mention anything about the number of target cells that can be attempted for the conditional handover before triggering re-establishment and hence the UE has the provision to decide on these factors. To solve the problems mentioned above, the UE may choose to try CHO on other cells which are meeting the criteria before the T304 time expiry.

Therefore, there is a need for a mechanism for conditional handover by user equipment in a 5G communication network.

SUMMARY

An example embodiment of the present disclosure provides a method for conditional handover by user equipment (UE) in a 5G communication network. The method may include: receiving, by the UE, a conditional handover command, and an associated condition from a source cell; receiving, by the UE, a plurality of target cell configurations, from the source cell, having details for a plurality of target cells meeting a conditional handover criterion; evaluating, by the UE, the received associated condition for the conditional handover; assigning priority to the received target cells configured in the conditional handover during the cell selection procedure; and selecting one target cell for conditional handover from among the plurality of target cells based on the assigned priority.

An example embodiment of the present disclosure provides a method for conditional handover by user equipment (UE) in a 5G communication network. The method may include: detecting a failure in connecting to the identified at least one target cell before the corresponding timer expiry; triggering a re-establishment based on the detected failure; initiating a cell selection procedure to find a cell for the re-establishment; storing the available measurement report for the conditional handover candidates; prioritizing the cells configured in conditional handover during the cell selection procedure for re-establishment based on at least one of the measured signal conditions, the number of beams detected in the cell, and the cell having configured contention-free random access (CFRA) resources over configured contention-based random access (CBRA) resources; adding the list of the plurality of target cells based on the above-assigned priority along with other detected target cells during connected mode measurement and cells detected in the idle mode; and sending a connection request to at least one target cell based on the received plurality of target cell configurations.

An example embodiment of the present disclosure provides a method for conditional handover by user equipment (UE) in a 5G communication network. The method may include: receiving a plurality of target cell configurations from a source cell having details for a plurality of target cells meeting the conditional handover criteria; detecting a failure in connecting to the identified at least one target cell before the corresponding timer expiry; determining whether the neighbor cell (Ncell) Scriteria is above a configurable threshold, wherein the configurable threshold is defined by the network; triggering the conditional handover if the Ncell Scriteria is above the threshold; and sending a connection request to at least one target cell based on the received plurality of target cell configurations.

An example embodiment of the present disclosure provides a method for conditional handover by user equipment (UE) in a 5G communication network. The method may include: receiving a plurality of target cell configurations from a source cell having details for a plurality of target cells meeting the conditional handover criteria; detecting a failure in connecting to the identified at least one target cell before the corresponding timer expiry; determining whether at least one of the conditions is satisfied from the received associated condition for the conditional handover; prioritizing the cells based on the detection; and sending a connection request to at least one target cell based on the received plurality of target cell configurations.

An example embodiment of the present disclosure provides a method for conditional handover by user equipment (UE) in a 5G communication network. The method may include: receiving a plurality of target cell configurations from a source cell having details for a plurality of target cells meeting the conditional handover criteria; detecting a failure in connecting to the identified at least one target cell before corresponding timer expiry; determining whether at least one of the conditions is satisfied from the received associated condition for the conditional handover; prioritizing the cells based on the detection; and sending a connection request to at least one target cell based on the received plurality of target cell configurations.

To further disclose the advantages and features of the present disclosure, a more particular description of the disclosure will be rendered by reference to specific embodiments thereof, which is illustrated in the appended drawings. It is appreciated that these drawings depict example embodiments and are therefore not to be considered limiting of its scope. The disclosure will be described and explained with additional specificity and detail with the accompanying drawings.

BRIEF DESCRIPTION OF THE DRAWINGS

These and other features, aspects, and advantages of certain embodiments of the present disclosure will be more apparent from the following detailed description, taken in conjunction with the accompanying drawings in which.

Figure 1A:
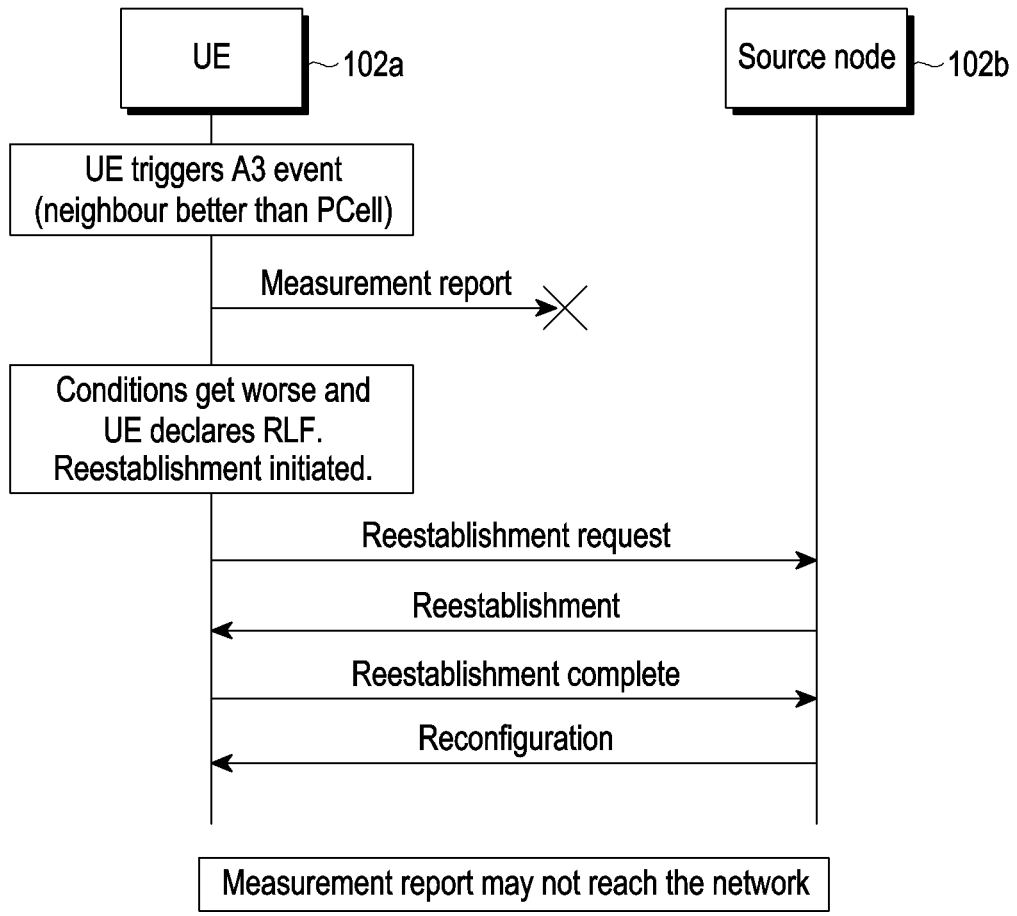
FIG. 1A is a signal flow diagram illustrating UE measurement report not reaching the network, according to an existing technique.
Figure 1B:
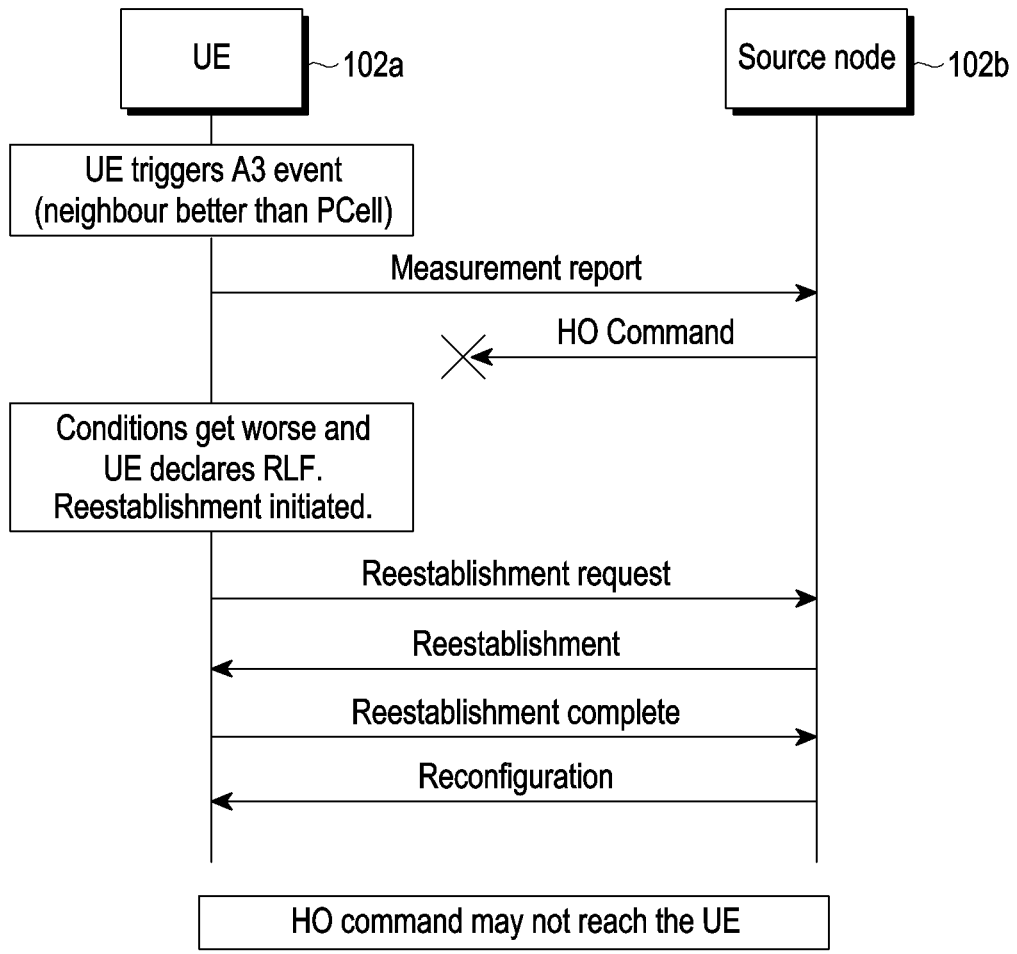
FIG. 1B is a signal flow diagram illustrating the network trying to respond with a handover command, according to an existing technique.
Figure 2:
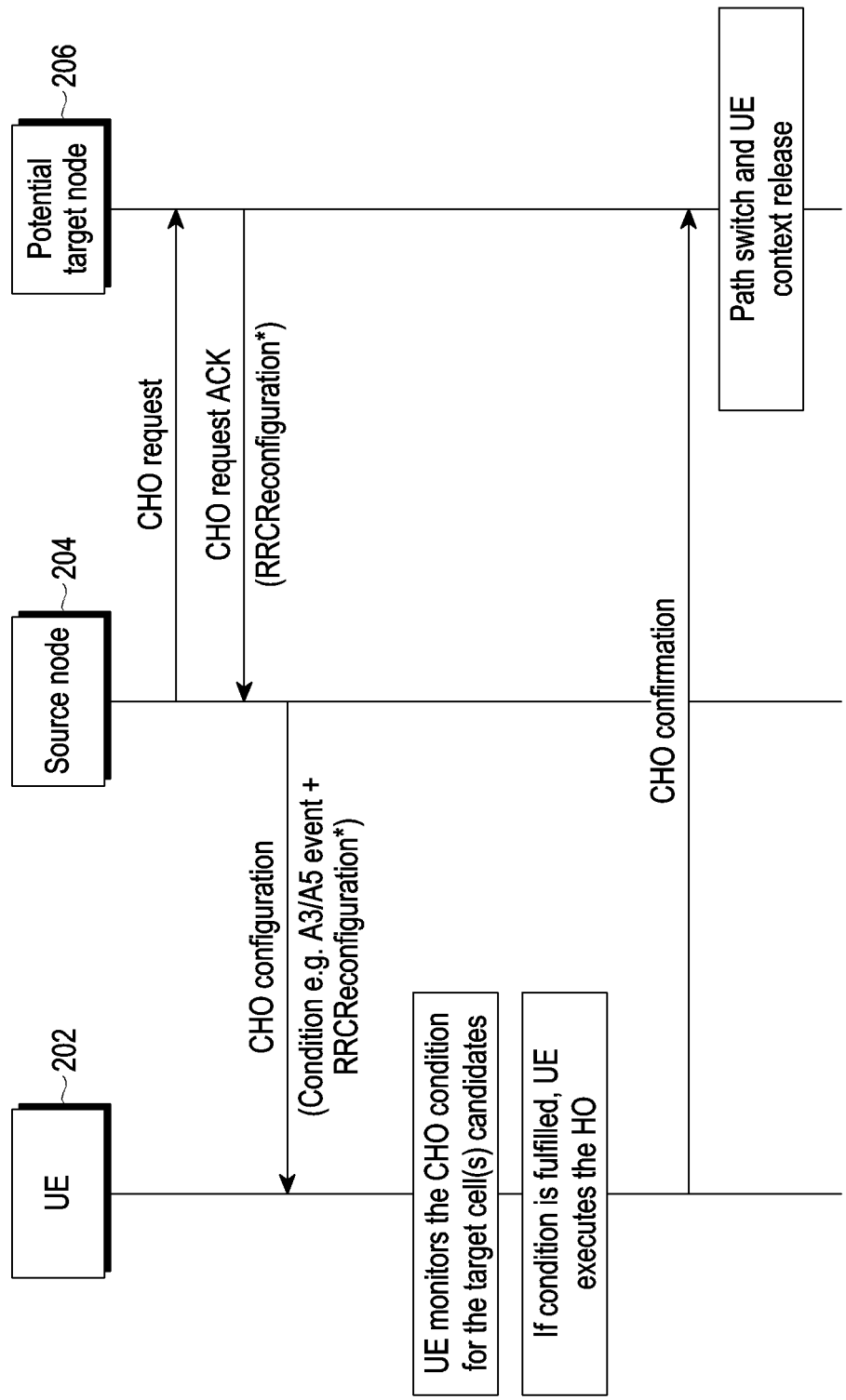
FIG. 2 is a signal flow diagram illustrating a method for conditional handover, according to an existing technique.

Further, skilled artisans will appreciate that elements in the drawings are illustrated for simplicity and may not have necessarily been drawn to scale. For example, the flowcharts illustrate the method in terms of the various steps or operations involved to improve understanding of aspects of the disclosure. Furthermore, in terms of the construction of the device, one or more components of the device may have been represented in the drawings by conventional symbols, and the drawings may show those specific details that are pertinent to understanding the embodiments of the disclosure so as not to obscure the drawings with details that will be readily apparent to those of ordinary skill in the art having the benefit of the description herein.

DETAILED DESCRIPTION

For the purpose of promoting an understanding of the principles of the disclosure, reference will now be made to the embodiment illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are merely examples and are not intended to be restrictive thereof.

Reference throughout this disclosure to "an aspect", "another aspect" or similar language may indicate that a particular feature, structure, or characteristic described in connection with an embodiment is included in at least one embodiment of the disclosure. Thus, appearances of the phrase "in an embodiment", "in another embodiment" and similar language throughout this disclosure may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Embodiments of the present disclosure will be described below in greater detail with reference to the accompanying figures.

Figure 3:
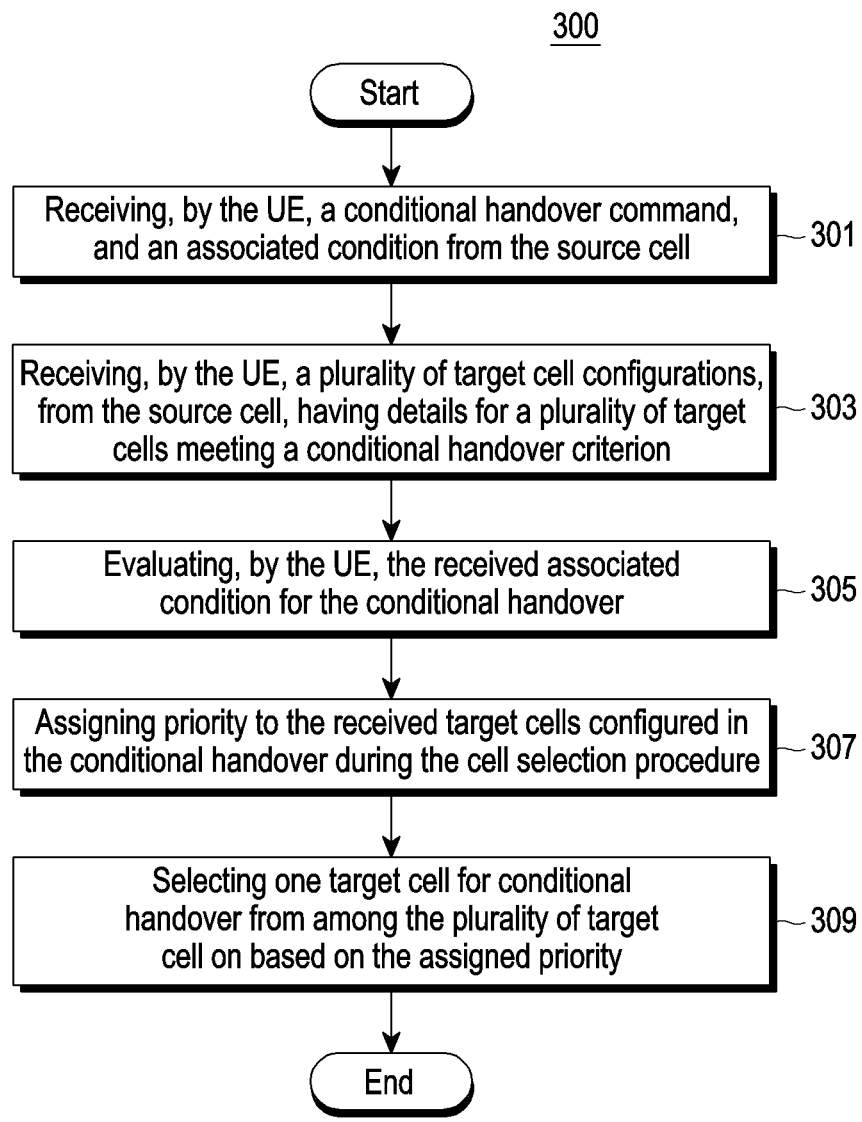
FIG. 3 is a flowchart illustrating an example method for conditional handover by user equipment in a 5G communication network, according to various embodiments.

FIG. 3 is a flowchart 300 illustrating an example method for conditional handover by user equipment in a 5G communication network, according various embodiments. The method 300 is being implemented by the user equipment. The method 300 may include receiving, at operation 301, by the UE, a conditional handover command, and an associated condition from the source cell. Each of the CHO commands may include one or more associated conditions for conditional handover from the source cell. For example, the associated conditions for conditional handover from the source cell may be that the signal quality of the cell exceeds a specific (or predefined) threshold within a specific (or predefined) period.

The method 300 may include receiving, at operation 303, by the UE, a plurality of target cell configurations, from the source cell, having details for a plurality of target cells meeting a conditional handover criterion. In an embodiment, the conditional handover configuration includes random access channel (RACH) configuration information. The RACH configuration information includes at least one of one or more beams associated with configured contention-free random access (CFRA) resources and one or more beams associated with configured contention-based random access (CBRA) resources.

The method 300 may include evaluating, at operation 305, by the UE, the received associated condition for the conditional handover.

The method 300 may include assigning at operation 307, priority to the received target cells configured in the conditional handover during the cell selection procedure. In an embodiment, the received target cell may be assigned priority by detecting and measuring the number of beams per cell in the received target cell and prioritizing the received target cell based on a maximum number of beams per cell and a reporting criterion. The reporting criteria may be defined by the network. The UE may be configured to prioritize the cell with the maximum number of beams, which are meeting CHO criteria. The UE may be configured to rank the cell based on the number of beams detected. The UE may be configured to detect and measure multiple beams in the cell.

If multiple cells are having the same priority after the above operation, the method may include prioritizing the cells or based on the number of beams in the cells which are having contention-free RACH configuration over the cells which do not have the CFRA configuration. This is to prioritize those cells which will have faster access as per the configuration.

According to an embodiment, method 300 may include determining a plurality of target cells are having the same assigned priority. Thereafter, the method may include identifying at least one target cell supporting contention-free beam access based on the received target cell configurations, from the determined plurality of target cells are having the same assigned priority. The method 300 may include assigning a priority to the identified received target cell supporting contention-free beam access.

If multiple cells are having the same priority after the above operation, the method may include prioritizing the cell based on the bandwidth, BW, configured. It is also possible to prioritize the cells based on the slices supported/configured by each cell and UE's interest in slices/services. According to an embodiment, the method 300 may include determining a plurality of target cells from the identified target cells are having the same assigned priority. The method 300 may include identifying a plurality of slices supported by the determined plurality of target cells having the same assigned priority. The method 300 may include assigning another priority to the determined target cells based on the UE's slice interest.

If multiple cells are having the same priority after the above operation, the method may include prioritizing the cell (or beam) based on the stability of the measurements. The stability of the measurement may refer, for example, to fewer fluctuations in measurements or no change in the beam ID measured with respect to the cell for a certain period. According to an embodiment, the method may include determining a plurality of target cells are having the same assigned priority. The method may include determining the stability of measurement of the determined target cell. The method 300 may include identifying and selecting at least one target cell from identified target cell based on the stability of measurements on identified target cells configured.

The stability of measurement may be based on at least one of the reference signals received power (RSRP), a reference signal received quality (RSRQ), and a signal to interference & noise ratio (SINR). The stability of measurement may be performed from the time UE sends the measurement report till the time the conditional handover criteria are met. The method for determining the stability of measurement includes checking at least one of RSRP, RSRQ, and SINR at the time of measurement report and handover decision, checking the number of beams detected at the time of measurement report and handover decision, and checking the best beam at the time of measurement report and handover decision. the plurality of the received target cell is assigned priority based on the stability of measurement.

The assignment of the priority by assigning a priority to the received target cell with at least one of the RSRP, the RSRQ, and the SINR difference at the time of measurement report and handover decision, assigning a second priority to the received target cell with a maximum matching beam at the time of measurement report and handover decision and assigning the third priority to the received target cell with no change in the best beam at the time of measurement report and handover decision. The assignment of the first priority, second priority, and third priority is in a predetermined (e.g., specified) order.

The method 300 includes selecting at operation 309, one target cell for conditional handover from among the plurality of target cells based on the assigned priority.

In an embodiment, if a cell selected for re-establishment is part of conditional handover configuration (varcondconfig), the UE may be configured to perform conditional handover instead of re-establishment.

Figure 4:
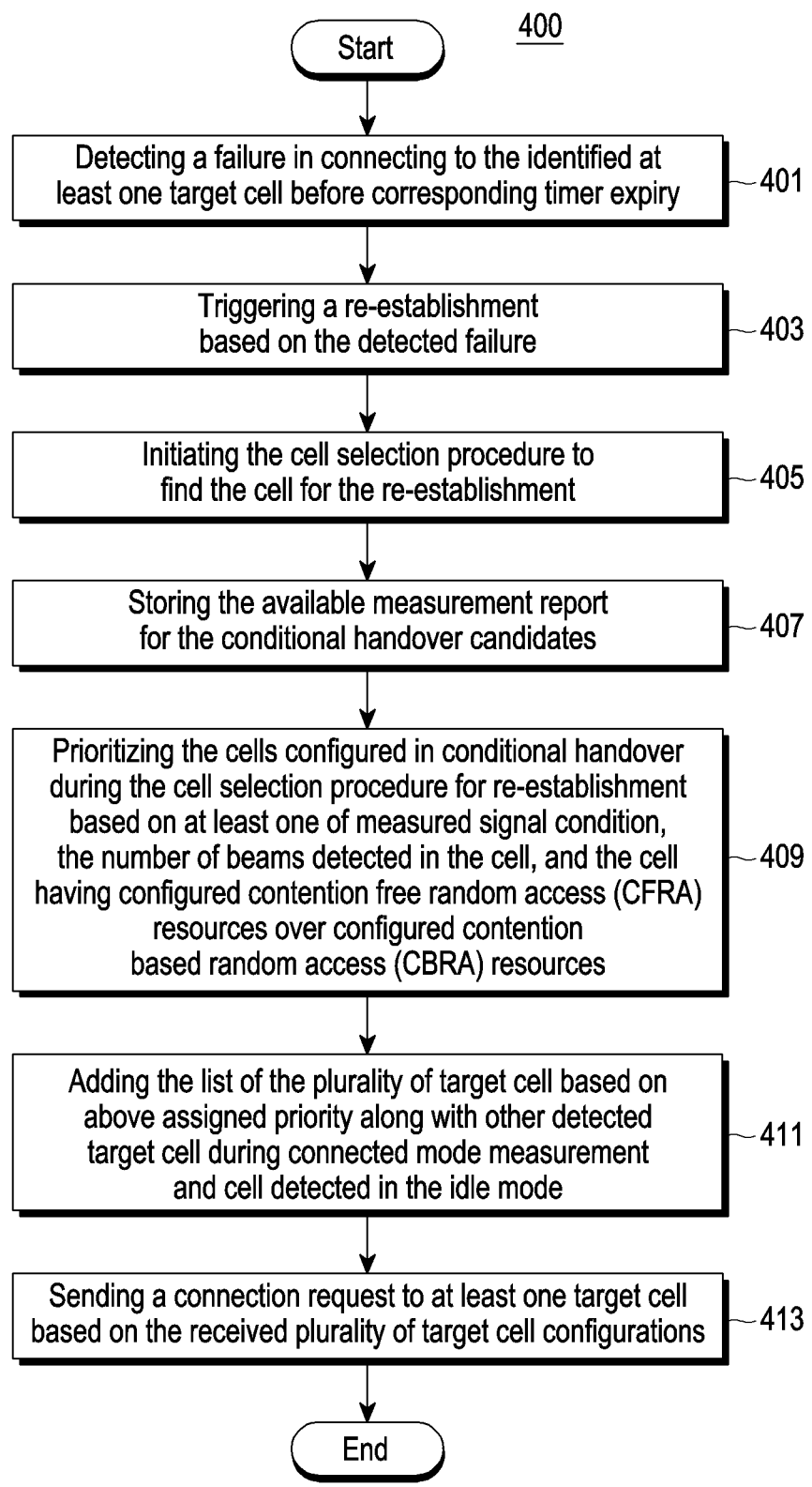
FIG. 4 is a flowchart illustrating an example method for conditional handover by user equipment in a 5G communication network, according to various embodiments.

FIG. 4 is a flowchart 400 illustrating an example method for conditional handover by user equipment in a 5G communication network, according to various embodiments. The method 400 is being implemented by the user equipment.

The method 400 may include at operation 401, detecting a failure in connecting to the identified at least one target cell before corresponding timer expiry. Below are a few examples of lower layer failures that can occur on serving cells and result in a radio link failure (RLF)

a) t310-Expiry:
   After N310 consecutive out-of-sync indications, UE may start T310 and RLF will be declared after T310 timer expiry;
   UE will know or can predict the failure at any time from the time of the start of detecting out-of-sync;
   UE may apply the solution mentioned here when UE detects and out-of-sync or N310/2 consecutive out-of-sync indications or when T310 is started;
   It is up to UE implementation when to start/apply the solution b) rlc-MaxNumRetx:
   After reaching the maximum number of retransmissions in RLC, RLF is declared;
   UE will know or can predict the failure at any time from the time of the start of retransmissions;
   It is up to UE implementation when to start/apply the solution. Based on configuration on when to trigger solution, RLC can notify RRC about the same.

c) random access problem:
   UE declares radio link failure due to the random-access problem indication from MAC;
   UE will know or can predict the failure at any time from the time of the start of RACH attempt failures;
   In normal case, MAC will notify RRC about RACH failure after the maximum possible attempts;
   It is up to UE implementation when to start/apply the solution. Based on configuration on when to trigger solution, MAC can notify RRC about the same.

Based on the above examples and method, the UE may detect a failure at any point of time from the time the failures are started and apply the logic/solution mentioned here (including for all similar lower layer failures). This is possible as no RLFs are triggered immediately at the start of failures and may be declared after reaching a threshold value.

The method 400 may include at operation 403, triggering a re-establishment based on the detected failure. Thereafter, the method 400 may include initiating at operation 405, the cell selection procedure to find the cell for the re-establishment. Further, the method 400 may include storing at operation 407, the available measurement report for the conditional handover candidates.

The method 400 may include prioritizing at operation 409, the cells configured in conditional handover during the cell selection procedure for re-establishment based on at least one of measured signal condition, the number of beams detected in the cell, and the cell having configured contention-free random access (CFRA) resources over configured contention-based random access (CBRA) resources. Further, prioritizing the cell based on measured signal condition includes checking for the minimum signal condition required to maintain the minimum quality of service to the user.

The method 400 may include adding at operation 411, the list of the plurality of target cells based on the above-assigned priority along with other detected target cells during connected mode measurement and cells detected in the idle mode. The method 400 may include, at operation 413 sending a connection request to at least one target cell based on the received plurality of target cell configurations.

In an embodiment, the CHO or CPC may execute only when the execution condition is satisfied. When T310 is running and the execution condition is not satisfied, then, the UE may eventually declare RLF and trigger RRE. The present subject matter avoids triggering such failures and triggers a conditional handover instead.

Figure 5:
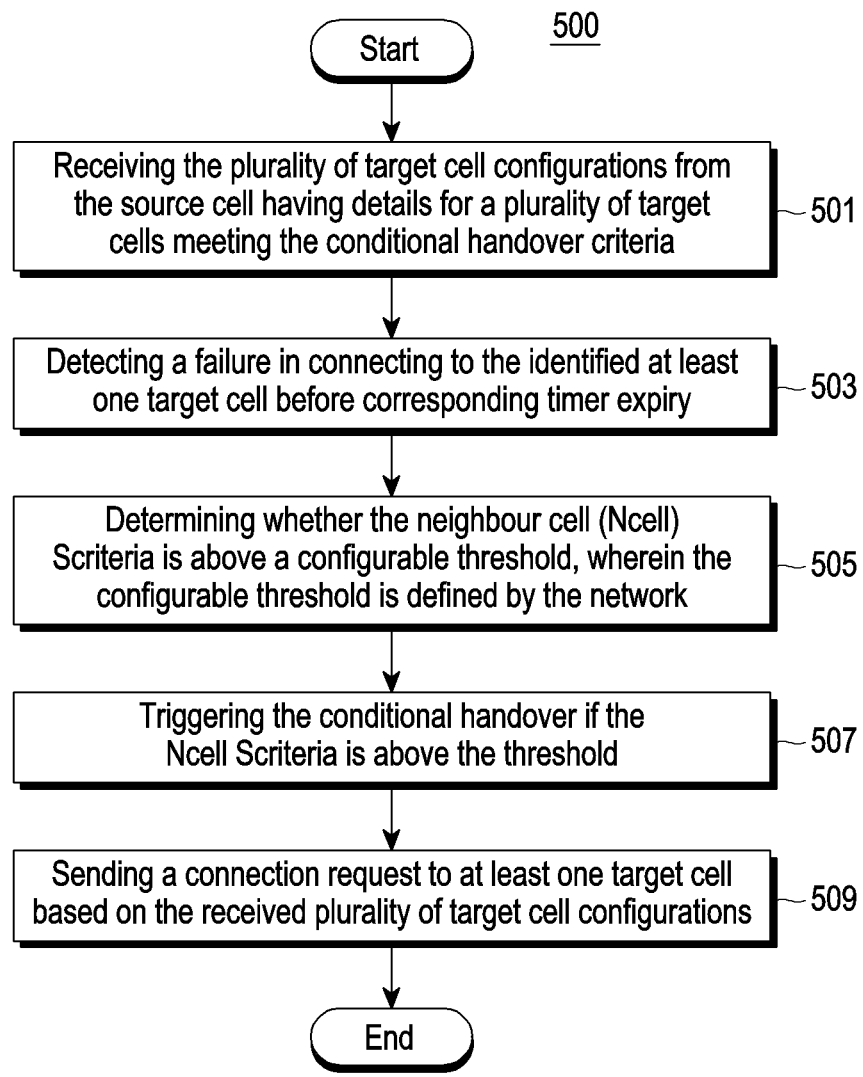
FIG. 5 is a flowchart illustrating an example method for conditional handover by user equipment in a 5G communication network, according to various embodiments.

FIG. 5 is a flowchart 500 illustrating an example method for conditional handover by user equipment in a 5G communication network, according to various embodiments. The method 500 is being implemented by the user equipment.

The method 500 may include receiving at operation 501, the plurality of target cell configurations from the source cell having details for a plurality of target cells meeting the conditional handover criteria. The method 500 may include detecting at operation 503, a failure in connecting to the identified at least one target cell before corresponding timer expiry. The method 500 may include determining at operation 505, whether the neighbor cell (Ncell) Scriteria is above a configurable threshold. The neighbor cell (Ncell) Scriteria) may include uplink (UL) interference level of each neighbor cell, Qoffset per serving cell, etc. Further, the cell selection value, S, may be defined using equation 1 below.

$$S = Q - Q\text{min} - P\text{compensation} \qquad \text{<Equation 1>}$$

S Cell Selection value, (dB)
Q Quality value. The quality of the received signal, (dB/dBm)
Qmin Minimum required quality level in the cell (read in system information and dependent on the quantity to measure), (dB/dBm)
Pcompensation max(MS_TXPWR_MAX−P_MAX, 0), (dB)
MS_TXPWR_MAX Maximum TX power level a UE may use when accessing the cell (read in system information), (dBm)
P_MAX Maximum RF output power of the UE, (dBm)

The method 500 may include triggering at operation 507, the conditional handover if the Ncell Scriteria is above the threshold. The method 500 may include sending at operation 509, a connection request to at least one target cell based on the received plurality of target cell configurations.

Figure 6A:
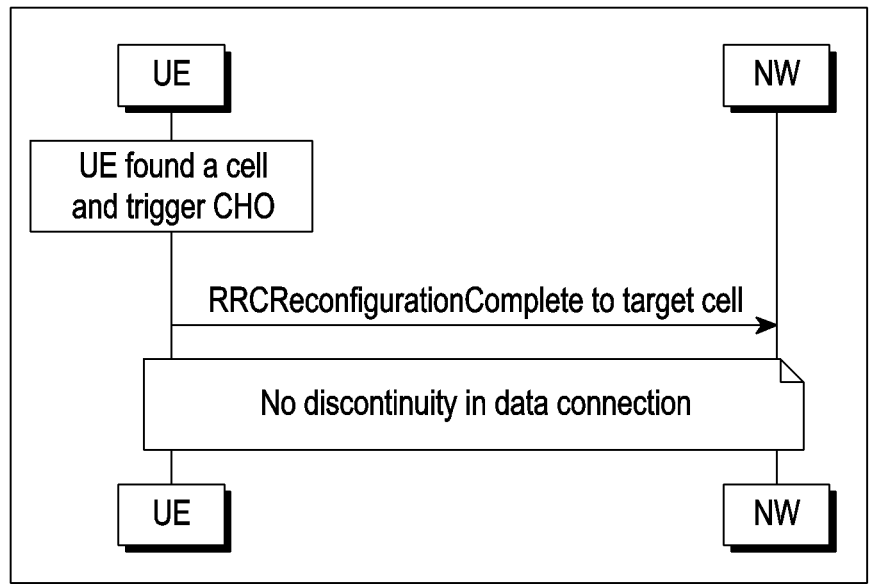
FIGS. 6A and 6B are signal flow diagrams illustrating example advantages of triggering CHO over triggering RRE, according to various embodiments.
Figure 6B:
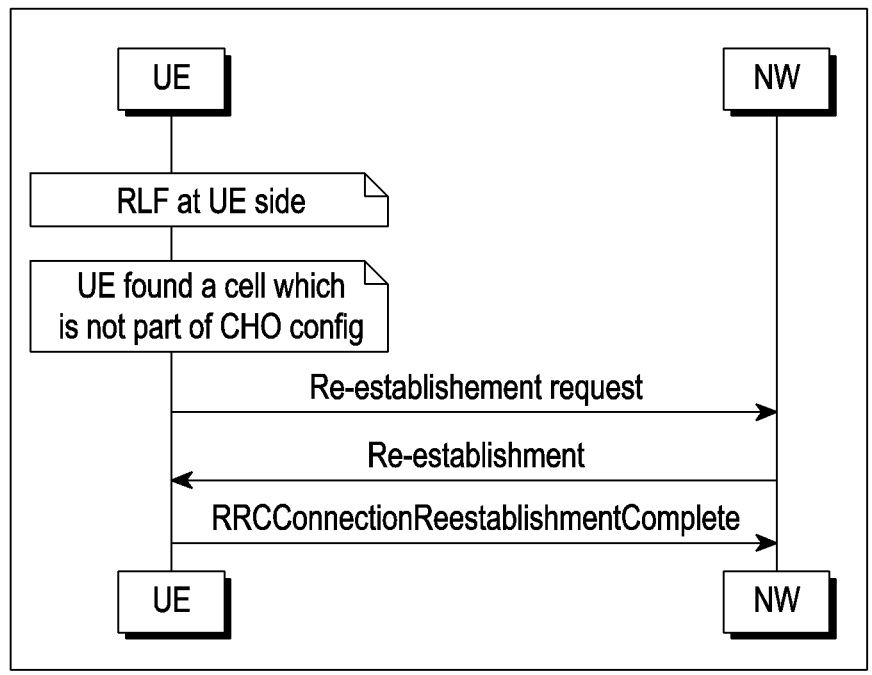

FIGS. 6A and 6B are signal flow diagrams illustrating example advantages of triggering CHO over triggering RRE, according to various embodiments. FIG. 6A illustrates the selection of cells present in the CHO configuration. FIG. 6B illustrates the selection of cells not present in CHO configuration according to the state of the art. Following are example advantages of triggering CHO over triggering remote radio equipment (RRE):

No discontinuity in data connection and hence it won't affect user experience

No need for further UE context exchange between the previous source cell and current source cell as in the case of RRE (UE context will be already known to the cell in the case of CHO)

RRE may further add delay to the connection if NW cannot re-establish the connection properly (due to no proper retrieval or UE context). This may also need a new TAU procedure with the new cell. None of these cases will be there for CHO as UE can immediately trigger access to the NW after conditional handover and this is a seamless procedure.

Figure 7:
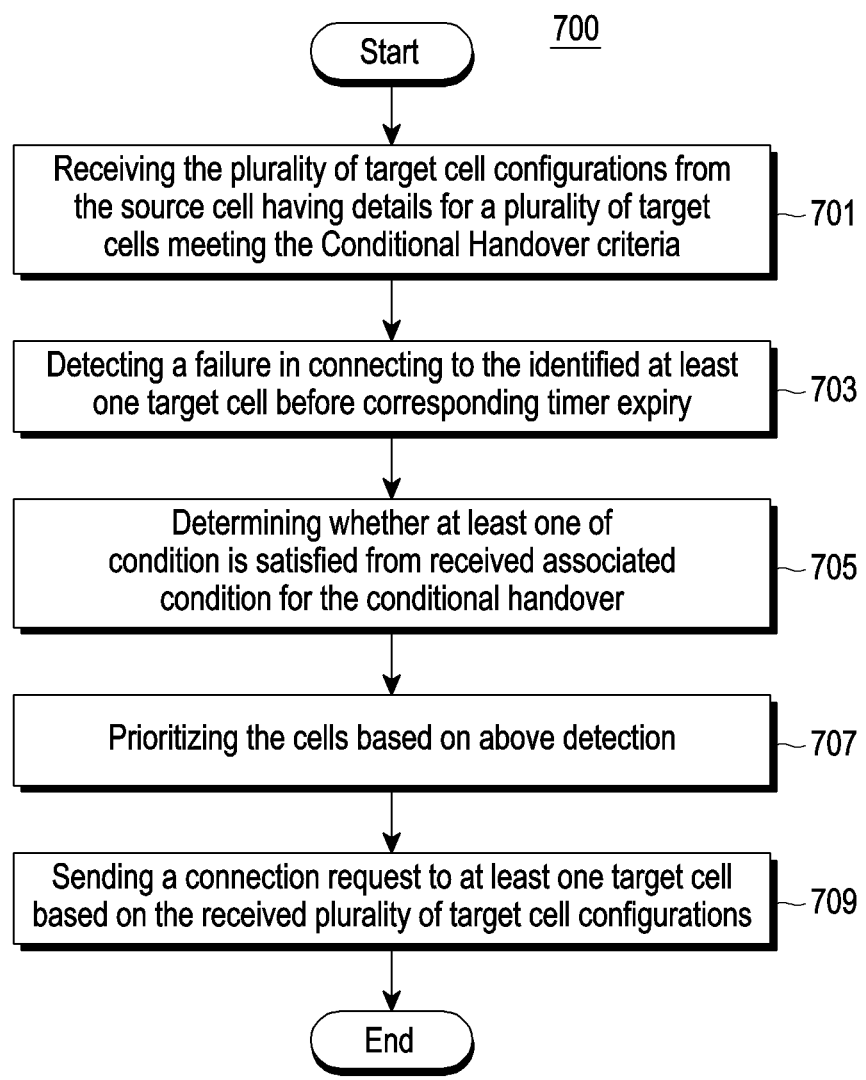
FIG. 7 is a flowchart illustrating an example method for conditional handover by user equipment in a 5G communication network, according to various embodiments.

FIG. 7 is a flowchart 700 illustrating an example method for conditional handover by the user equipment in a 5G communication network, according to various embodiments. The method 700 is being implemented by the user equipment.

The method 700 may include receiving at operation 701, the plurality of target cell configurations from the source cell having details for a plurality of target cells meeting the conditional handover criteria. The method 700 may include detecting at operation 703, a failure in connecting to the identified at least one target cell before corresponding timer expiry. The method 700 may include determining at operation 705, whether at least one of the conditions is satisfied from the received associated condition for the conditional handover. The method 700 may include prioritizing at operation 707, the cells based on the above determination. The method 600 may include sending at operation 709, a connection request to at least one target cell based on the received plurality of target cell configurations.

According to an embodiment, the method may include predicting a connection failure between the UE and the source cell before the conditional handover is completed and sending a connection request to at least one target cell based on the received plurality of target cell configurations.

According to an embodiment, the method may include evaluating continuously received plurality of target cells for the conditional handover. The method may include detecting whether the condition handover is failed for one of the received target cells. The method may include determining whether a timer (T304) is not expired, and the conditional handover condition is met for at least one of the received target cells. The method may include sending a connection request to at least one target cell based above evaluation of the received plurality of target cell configurations.

Figure 8:
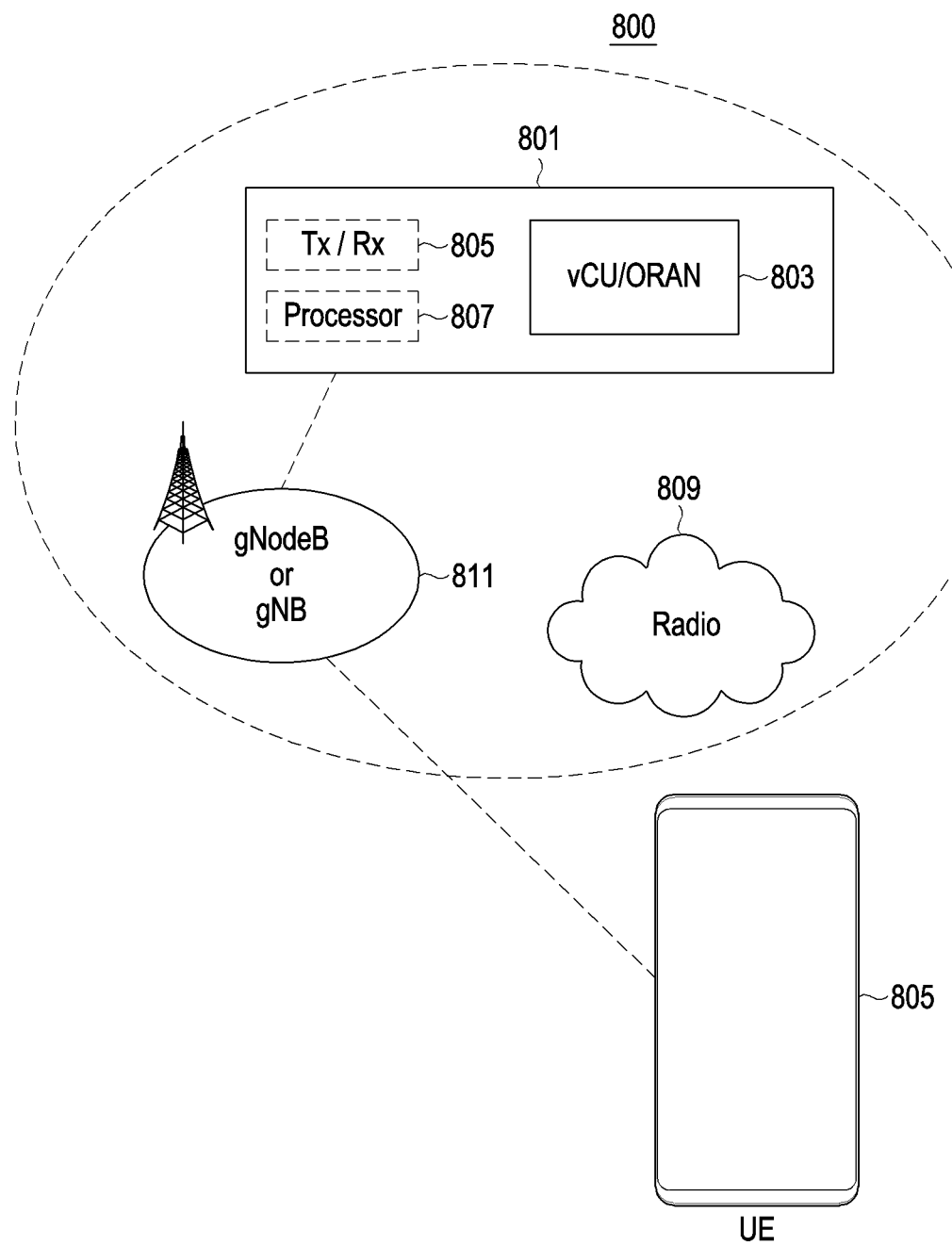
FIG. 8 is a diagram illustrating an example system for conditional handover in a 5G communication network, according to various embodiments.

FIG. 8 is a diagram illustrating an example system for conditional handover in a 5G communication network, according to various embodiments. The system 800 includes network node 801, user equipment 805, gNodeB (or gNB) 811, radio 809. The network node 801 includes vCU/ORAN 803, a transceiver (Tx/Rx) 805, and at least one processor (e.g., including processing circuitry) 807 coupled to the transceiver 805. The UE 805 may include but is not limited to, a mobile station, a mobile terminal or device, a user communication radio terminal. For example, a UE 805 may be portable radio equipment, which includes, but is not limited to, a mobile phone, a tablet, a wearable device, a sensor, or a personal digital assistant (PDA) with wireless communication capability. The UE 805 may be configured to receive and transmit signals over an air interface to one or more cells in the radio access network.

The UE 805 may be configured to receive a plurality of target cell configurations, from the source cell, having details for a plurality of target cells meeting a conditional handover criterion. In an embodiment, the conditional handover configuration includes random access channel (RACH) configuration information. The RACH configuration information includes at least one of one or more beams associated with configured contention-free random access (CFRA) resources and one or more beams associated with configured contention-based random access (CBRA) resources. The UE 805 may be configured to evaluate the received associated condition for the conditional handover.

According to an embodiment, the UE 805 may be configured to assign priority to the received target cells configured in the conditional handover during the cell selection procedure. In an embodiment, the received target cell may be assigned priority by detecting and measuring the number of beams per cell in the received target cell and prioritizing the received target cell based on a maximum number of beams per cell and a reporting criterion. The reporting criteria may be defined by a network. The UE 805 may be configured to prioritize the cell with the maximum number of beams, which are meeting CHO criteria. The UE 805 may be configured to rank the cell based on the number of beams detected.

According to an embodiment, the UE 805 may be configured to determine a plurality of target cells are having the same assigned priority. Thereafter, the UE 805 may be configured to identify at least one target cell supporting contention-free beam access based on the received target cell configurations, from the determined plurality of target cells are having the same assigned priority. The UE 805 may be configured to assign a priority to the identified received target cell supporting contention-free beam access.

According to an embodiment, the UE 805 may be configured to determine a plurality of target cells from the identified target cells are having the same assigned priority. The UE 805 may be configured to identify a plurality of slices supported by the determined plurality of target cells having the same assigned priority. The UE 805 may be configured to assign another priority to the determined target cells based on the UE's slice interest.

According to an embodiment, the UE 805 may be configured to determine a plurality of target cells are having the same assigned priority. The UE 805 may be configured to determine the stability of measurement of the determined target cell. The UE 805 may be configured to identify and select at least one target cell from identified target cell based on the stability of measurements on identified target cells configured. The stability of measurement may be based on at least one of a reference signal received power (RSRP), a reference signal received quality (RSRQ), and a signal to interference & noise ratio (SINR).

The stability of measurement may be performed from the time UE sends the measurement report till the time the conditional handover criteria are met. The UE 805 may be configured to determine the stability of measurement by checking at least one of RSRP, RSRQ, and SINR at the time of measurement report and handover decision, checking the number of beams detected at the time of measurement report and handover decision, and checking the best beam at the time of measurement report and handover decision. the plurality of the received target cell is assigned priority based on a stability of measurement.

The assignment of the priority by assigning a priority to the received target cell with at least one of the RSRP, the RSRQ, and the SINR difference at the time of measurement report and handover decision, assigning a second priority to the received target cell with a maximum matching beam at the time of measurement report and handover decision and assigning the third priority to the received target cell with no change in the best beam at the time of measurement report and handover decision. The assignment of the first priority, second priority, and third priority is in a predetermined order.

According to an embodiment, the UE 805 may be configured to select one target cell for conditional handover from among the plurality of target cells based on the assigned priority.

According to an embodiment, user equipment 805 may be configured for conditional handover in a 5G communication network. The UE 805 may be configured to receive detecting a failure in connecting to the identified at least one target cell before the corresponding timer expiry.

According to an embodiment, the UE 805 may be configured to trigger a re-establishment based on the detected failure. The UE 805 may be configured to initiate the cell selection procedure to find the cell for the re-establishment. Further, the UE 805 may be configured to store the available measurement report for the conditional handover candidates.

According to an embodiment, The UE 805 may be configured to prioritize the cells configured in conditional handover during the cell selection procedure for re-establishment based on at least one of measured signal condition, the number of beams detected in the cell, and the cell having configured contention-free random access (CFRA) resources over configured contention-based random access (CBRA) resources. Further, prioritizing the cell based on measured signal condition includes checking for the minimum signal condition required to maintain the minimum quality of service to the user.

According to an embodiment, the UE 805 may be configured to add the list of the plurality of target cells based on the above-assigned priority along with other detected target cells during connected mode measurement and cell detected in the idle mode. Subsequently, the UE 805 may be configured to send a connection request to at least one target cell based on the received plurality of target cell configurations.

According to another embodiment, user equipment 805 may be configured for conditional handover in a 5G communication network. The UE 805 includes a transceiver and at least one processor 807 coupled to the transceiver. The UE 805 may be configured to receive the plurality of target cell configurations from the source cell having details for a plurality of target cells meeting the conditional handover criteria. The UE 805 may be configured to detect a failure in connecting to the identified at least one target cell before the corresponding timer expiry. The UE 805 may be configured to determine whether the neighbor cell (Ncell) Scriteria is above a configurable threshold. Further, the UE 805 may be configured to trigger the conditional handover if the Ncell Scriteria is above the threshold. The UE 805 may be configured to send a connection request to at least one target cell based on the received plurality of target cell configurations.

The UE 805 includes a transceiver and at least, one processor coupled to the transceiver. The UE 805 may be configured to receive the plurality of target cell configurations from the source cell having details for a plurality of target cells meeting the conditional handover criteria. The UE 805 may be configured to detect a failure in connecting to the identified at least one target cell before the corresponding timer expiry.

According to an embodiment, The UE 805 may be configured to determine whether at least one of the conditions is satisfied from the received associated condition for the conditional handover. The UE 805 may be configured to prioritize the cells based on the above determination. The UE 805 may be configured to send a connection request to at least one target cell based on the received plurality of target cell configurations.

According to an embodiment, the UE 805 may be configured to predict a connection failure between the UE 805 and the source cell before the conditional handover is completed and send a connection request to at least one target cell based on the received plurality of target cell configurations.

According to an embodiment, the UE 805 may be configured to evaluate continuously received plurality of target cells for the conditional handover. The UE 805 may be configured to detect whether the condition handover is failed for one of the received target cells. The UE 805 may be configured to determine whether a timer (T304) is not expired, and the conditional handover condition is met for at least one of the received target cells. The UE 805 may be configured to send a connection request to at least one target cell based above evaluation of the received plurality of target cell configurations.

Figure 9:
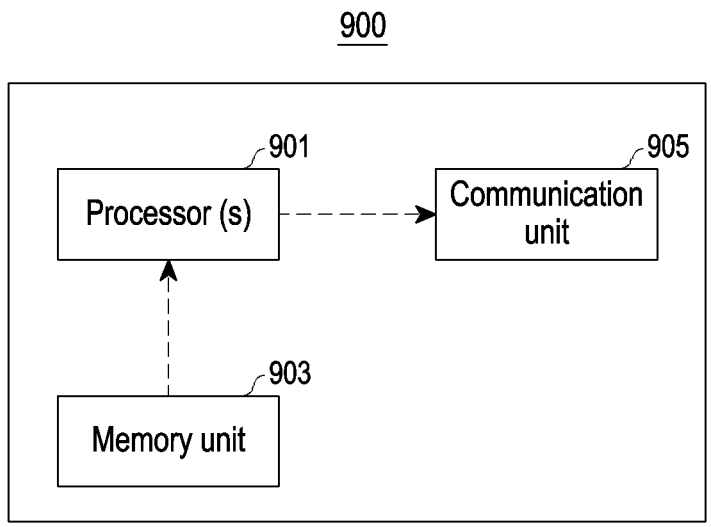
FIG. 9 is a block diagram illustrating an example configuration of user equipment for conditional handover in a 5G communication network, according to various embodiments.

FIG. 9 is a block diagram illustrating an example configuration of a network node according to various embodiments. The network node 900 may include a communication unit (e.g., including communication circuitry) 905 (e.g., communicator or communication interface), a memory unit (e.g., including a memory) 903 (e.g., storage), and at least one processor (e.g., including processing circuitry) 901. Further, the network node 900 may also include the Cloud-RAN (C-RAN), a Central Unit (CU), a core network (NW), a distributed unit (DU), or a TRP controller or any other possible network (NW) entity. The communication unit 905 may perform functions for transmitting and receiving signals via a wireless channel.

In an example, the processor 905 may be a single processing unit or a number of units, all of which could include multiple computing units. The processor 905 may be implemented as one or more microprocessors, microcomputers, microcontrollers, digital signal processors, central processing units, state machines, logic circuitries, and/or any devices that manipulate signals based on operational instructions. Among other capabilities, the processor 905 is configured to fetch and execute computer-readable instructions and data stored in the memory. The processor may include one or a plurality of processors. At this time, one or a plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). One or a plurality of processors control the processing of the input data in accordance with a predefined operating rule or artificial intelligence (AI) model stored in the non-volatile memory and the volatile memory. The predefined operating rule or artificial intelligence model is provided through training or learning.

The memory may include any non-transitory computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes.

Figure 10:
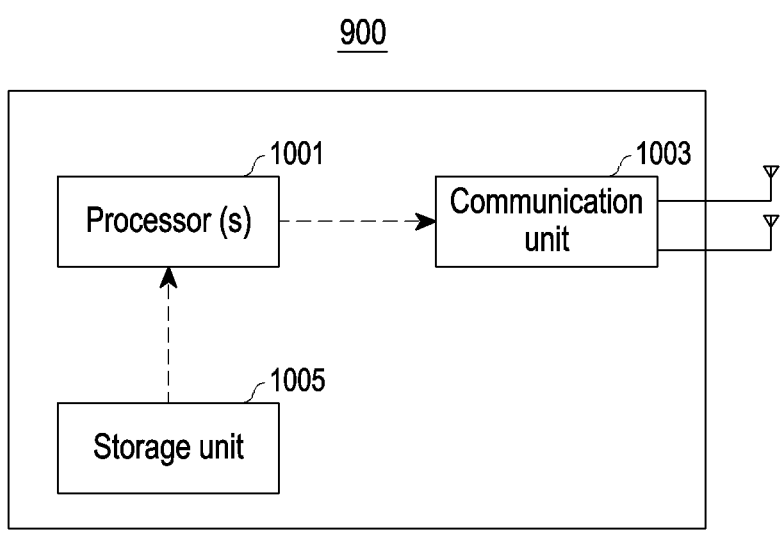
FIG. 10 is a block diagram illustrating an example configuration of a terminal in a wireless communication system according to various embodiments.

FIG. 10 is a block diagram illustrating an example configuration of a terminal 1000 in a wireless communication system according to various embodiments. The configuration of FIG. 10 may be understood as a part of the configuration of terminal 1000. Hereinafter, it is understood that terms including "unit" or "er" at the end may refer to the unit for processing at least one function or operation and may be implemented in hardware, software, or a combination of hardware and software.

Referring to FIG. 10, terminal 1000 may include a communication unit (e.g., including communication circuitry) 1003 (e.g., communicator or communication interface), a storage unit (e.g., a memory) 1005 (e.g., storage), and at least one processor (e.g., including processing circuitry) 1001. By way of example, the terminal 1000 may be a User Equipment, such as a cellular phone or other devices that communicate over a plurality of cellular networks (such as a 4G, a 5G or pre-5G network or any future wireless communication network).

The communication unit 1003 may include various communication circuitry and perform functions for transmitting and receiving signals via a wireless channel.

In an example, the module(s)/engine may include a program, a subroutine, a portion of a program, a software component, or a hardware component capable of performing a stated task or function. As used herein, a module(s)/engine may be implemented on a hardware component such as a server independently of other modules, or a module can exist with other modules on the same server, or within the same program. The module(s)/engine may be implemented on a hardware component such as processor one or more microprocessors, microcomputers, microcontrollers, digital signal processors, central processing units, state machines, logic circuitries, and/or any devices that manipulate signals based on operational instructions. The module(s)/engine when executed by the processor may be configured to perform any of the described functionalities Unless otherwise defined, all technical and scientific terms used herein have the same meaning as commonly understood by one of ordinary skilled in the art to which this disclosure belongs. The system, methods, and examples provided herein are illustrative only and not intended to be limiting.

The actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the disclosure or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems and any component(s) that may cause any benefit, advantage, or solution to occur or become more pronounced are not to be construed as a critical, required, or essential feature or component of any or all the claims.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method for conditional handover by a user equipment (UE) in a 5G communication network, the method comprising:
    receiving, by the UE, a conditional handover command, and an associated condition from a source cell;
    receiving, by the UE, a plurality of target cell configurations, from the source cell, including details for a plurality of target cells meeting a conditional handover criterion;
    evaluating, by the UE, the associated condition for the conditional handover;
    assigning priority to the plurality of target cells configured in the conditional handover during a cell selection procedure;
    selecting a first target cell for the conditional handover from among the plurality of target cells based on the assigned priority;
    detecting, by the UE, a failure in connecting to the first target cell before expiry of a timer; and
    selecting a second target cell for conditional handover from among the plurality of target cells based on the assigned priority.

2. The method of claim 1, wherein each of the plurality of target cells is assigned priority by:
    detecting and measuring a number of beams per cell in each of the plurality of target cells; and
    prioritizing the plurality of target cells based on a maximum number of beams per cell and a reporting criterion of reporting criteria, wherein the reporting criteria are defined by a network.

3. The method of claim 1, wherein each of the plurality of target cells is assigned priority by:
    determining a plurality of target cells having a same assigned priority;
    identifying at least one target cell supporting a contention-free beam access based on the received target cell configurations, from the determined plurality of target cells are having the same assigned priority; and
    assigning a priority to the identified at least one target cell supporting contention-free beam access.

4. The method of claim 1, wherein each of the plurality of target cells is assigned priority by:
    determining a plurality of target cells having a same assigned priority;
    identifying a plurality of slices supported by the determined plurality of target cells having the same assigned priority; and
    assigning another priority to the determined target cells based on a slice interest of the UE.

5. The method of claim 1, wherein each of the plurality of target cells is assigned priority by:
    determining a plurality of target cells from the identified at least one target cell having the same assigned priority;
    identifying a bandwidth (BW) configured for the determined plurality of target cells having the same assigned priority; and
    assigning another priority to the determined target cell based on the BW configured.

6. The method of claim 1, further comprising:
    determining a plurality of target cells having a same assigned priority;
    determining stability of measurement of each determined target cell, wherein the stability of measurement is based on at least one of a reference signal received power (RSRP), a reference signal received quality (RSRQ), and a signal to interference & noise ratio (SINR), wherein the stability of measurement is performed from a time UE sends a measurement report to a network for the determined target cell until a time when the conditional handover criterion is met for the determined target cell, the method for determining the stability of measurement comprising:
    checking at least one of RSRP, RSRQ, and SINR at a time of the measurement report is sent and a handover decision for the UE is made;

checking a number of beams detected at the time of measurement report and at the time of the handover decision; and checking a best beam at the time of measurement report and at the time of the handover decision; and identifying and selecting at least one target cell from identified target cell based on the stability of measurements on identified target cells configured.

7. The method of claim 6, wherein each of the plurality of target cells is assigned priority based on a stability of measurement, the assignment of the priority comprising:

assigning a first priority to the plurality of target cells with at least one of the RSRP, the RSRQ, and the SINR at the time of measurement report and handover decision;

assigning a second priority to the plurality of target cells with a maximum matching beam at the time of measurement report and handover decision; and assigning a third priority to the plurality of target cells with no change in the best beam at the time of measurement report and handover decision, wherein the assignment of the first priority, second priority, and a third priority is in a predetermined order.

8. The method of claim 1, wherein a conditional handover configuration includes random access channel (RACH) configuration information, wherein the RACH configuration information comprises at least one of:

one or more beams associated with configured contention-free random access (CFRA) resources; and one or more beams associated with configured contention-based random access (CBRA) resources.

9. A user equipment (UE) configures for conditional handover in a 5G communication network, the UE comprising:

a transceiver;

at least one processor comprising processing circuitry and coupled to the transceiver; and memory storing instructions which, when executed individually and/or collectively by the at least one processor, cause the UE to:

receive a conditional handover command, and an associated condition from a source cell;

receive a plurality of target cell configurations, from the source cell, having details for a plurality of target cells meeting a conditional handover criterion;

evaluate the associated condition for the conditional handover;

assign priority to the plurality of target cells configured in the conditional handover during a cell selection procedure;

select a first target cell for the conditional handover from among the plurality of target cells on based on the assigned priority;

detect a failure in connecting to the first target cell before expiry of a timer; and select a second target cell for conditional handover from among the plurality of target cells based on the assigned priority.

10. The UE of claim 9, wherein for assigning priority to each of the plurality of target cells, the instructions when executed individually and/or collectively by the at least one processor, cause the UE to:

detect and measure a number of beams per cell in each of the plurality of target cells; and prioritize the plurality of target cells based on a maximum number of beams per cell and a reporting criterion of reporting criteria, wherein the reporting criteria are defined by a network.

11. The UE of claim 9, wherein for assigning priority to each of the plurality of target cells, the instructions when executed individually and/or collectively by the at least one processor, cause the UE to:

determine a plurality of target cells having a same assigned priority;

identify at least one target cell supporting contention-free beam access based on the received target cell configurations, from the determined plurality of target cells having the same assigned priority; and assign a priority to the identified at least one target cell supporting contention-free beam access.

12. The UE of claim 9, wherein the instructions when executed individually and/or collectively by the at least one processor, cause the UE to:

determine a plurality of target cells having a same assigned priority;

identify a plurality of slices supported by each of the determined plurality of target cells having the same assigned priority; and assign another priority to the determined target cells based on a slice interest of the UE.

13. The UE of claim 9, wherein for assigning priority to each of the plurality of target cells, the instructions when executed individually and/or collectively by the at least one processor, cause the UE to:

determine a plurality of target cells having a same assigned priority;

identify a bandwidth (BW) configured for the determined plurality of target cells having the same assigned priority; and assign another priority to the determined target cell based on the configured BW.

14. The UE of claim 9, wherein for assigning priority to the received target cell, the instructions when executed individually and/or collectively by the at least one processor, cause the UE to:

determine a plurality of target cells having a same assigned priority;

determine a stability of measurement of each determined target cell, wherein the stability of measurement is based on at least one of a reference signal received power (RSRP), a reference signal received quality (RSRQ), and a signal to Interference and Noise Ratio (SINR), wherein the stability of measurement is performed from a time UE sends a measurement report to a network for the determined target cell until a time when the conditional handover criterion are met for the determined target cell, the processor, for determining the stability of measurement, is configured to:

check at least one of RSRP, RSRQ, and SINR at a time of the measurement report is sent and a handover decision for the UE is made;

check a number of beams detected at the time of measurement report and at the time of the handover decision; and check a best beam at the time of measurement report and at the time of the handover decision; and identify and select at least one target cell from the identified target cells based on the stability of measurements on identified target cells configured.

15. The UE of claim 14, wherein the plurality of received target cells are assigned priority based on a stability of measurement, the instructions when executed individually and/or collectively by the at least one processor, cause the UE to:

assign a first priority to the plurality of target cells with at least one of the RSRP, the RSRQ, and the SINR at the time of measurement report and handover decision;

assign a second priority to the plurality of target cells with a maximum matching beam at the time of measurement report and handover decision; and assign a third priority to the plurality of target cells with no change in the best beam at the time of measurement report and handover decision, wherein the assignment of the first priority, second priority, and third priority are in a specified order.

16. The UE of claim 9, wherein a conditional handover configuration includes random access channel (RACH) configuration information, wherein the RACH configuration information comprising at least one of:

one or more beams associated with configured contention-free random access (CFRA) resources; and one or more beams associated with configured contention-based random access (CBRA) resources.

\* \* \* \* \*